United States Patent Office 3,462,906
Patented Aug. 26, 1969

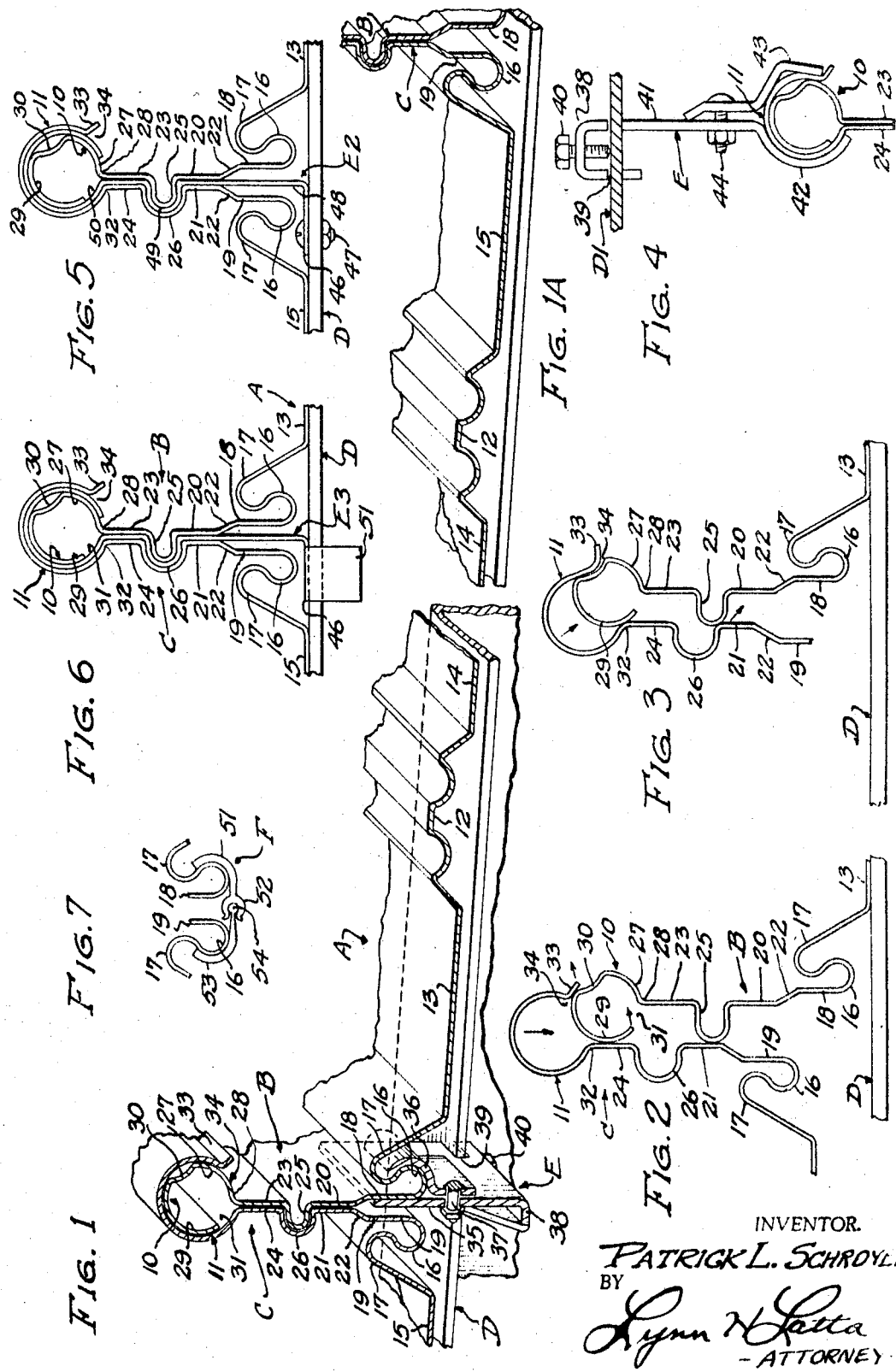

3,462,906
COUPLED CHANNEL PANELLING FOR CEILINGS, ROOFS, SIDING AND THE LIKE
Patrick L. Schroyer, 12071 S. Downey Ave., Downey, Calif. 90242
Filed July 13, 1967, Ser. No. 653,157
Int. Cl. E04b 5/52, 7/00
U.S. Cl. 52—478    3 Claims

ABSTRACT OF THE DISCLOSURE

A ceiling, roof, and siding structure of rolled channel section panels connected side-by-side by coupled male and female marginal beads and attached to supporting rafters or beams by hold-down or suspension clips. The coupled beads provide water-tight joints between the panels.

THE PRIOR ART

Roof and ceiling structures comprising panels of channel section coupled by male-female beads, have been widely used in a form wherein the female bead is initially in an open condition prior to assembly, and is closed with a "zipping" action in which a closing tool is run lengthwise along the open bead, closing it around the male bead which had previously been inserted therein. Coupled channel section panels are disclosed in the following prior patents:

Guthrie, 324,994, Metallic Roofing
Sagendorph, 417,947 and 417,948, Metal Roofing
Faulhaber, 419,512, Roofing
Norman, 1,090,334, Ridge Cap
Strong, 1,558,410, Sheet Metal Roofing
Delk, 2,159,136, Joint for Sheet Metal Roofing
Brown, 2,918,996, Aluminum Panel Joint.

RÉSUMÉ OF THE INVENTION

The present invention provides a channel section panel that does not require the use of a bead-closing tool for coupling it to another like panel. It is particularly characterized in that the beads are coupled to one another by springing the female bead of one panel over the male bead of an adjacent panel under applied pressure, with a snap action, and in having means for locking the coupled channels so as to inhibit the separation of the coupled beads and so as to attain mutual reenforcement of the coupled channels by one another, after they have been attached to a support. The locking means is in the form of nesting beads in the median webs of the channel flanges, adjacent the coupling beads which are on the margins of such flanges. When the newly-coupled panel has been attached to the support, the locking beads are secured in locked condition, thus locking the panels together.

Objects of the invention are to provide panels of rolled channel section having respective male and female locking beads:

(1) Providing a watertight roof of long spans between supporting beams (up to 15 feet);
(2) Which can easily be composed of long panel lengths (e.g. up to 100 feet or more);
(3) Wherein panels can extend (without splicing) from gable to eave of a building, with no joints that could cause leaking, and without any holes pierced through the panels, which might cause leaking;
(4) Adapted to be coupled by springing the female bead of one panel over the male bead of an adjacent panel, by the use of pressure;
(5) Avoiding the necessity for closing an initially open female bead;
(6) Having a moisture trap in the male bead which facilitates the coupling of the beads in addition to its moisture-trapping function;
(7) Having locking means function to lock the channels against separation of the coupling beads, and also to provide for mutual reinforcement of adjacent panels, one by the other;
(8) Adapted to secure the locked condition by attachment of the panels to a support in a common plane.

DESCRIPTION OF INVENTION

The foregoing and other objects will be apparent in the ensuing description and appended drawing, in which:

FIGS. 1 and 1A are perspective sectional views of the leftward and rightward portions respectively of a roof or ceiling panel embodying the invention, together with portions of the support beam on which the panel is mounted, one form of mounting clip being illustrated in FIG. 1;

FIG. 2 is an end view of portions of a pair of adjacent panels, illustrating the method of coupling them together;

FIG. 3 is an end view of the same, in an intermediate stage of coupling;

FIG. 4 is an end view of a modified form of mounting clip, shown attaching the panel in suspended condition to a flange of a support beam, shown in section;

FIGS. 5 and 6 are end views of other modified forms of the mounting clip; and

FIG. 7 is a fragmentary section of a clamping clip.

Referring now to the drawing in detail, and in particular to FIGS. 1 and 1A, I have shown therein, as an example of one form in which the invention may be embodier, respective side portions of a ceiling panel of channel form, together with fragmentary portions of panels coupled to the respective sides thereof. Substantially a full cross-section of one panel is disclosed by FIGS. 1 and 1A taken together. The panel includes a bottom A, a side flange B with male bead on its margin, and an opposite side flange C with a female bead on its margin, adapted for coupling to a male bead of an adjoining panel. The male bead is shown at 10 at the leftward side of the panel as seen in FIG. 1, and the female bead is seen at 11 in FIG. 1 on the rightward fragment of the leftwardly adjoining panel. The male bead 10 is received in the female bead 11 as shown.

A roof or ceiling assembly also includes a suitable supporting frame including a plurality of transverse beams such as beam D on top of which the panels are supported in spaced relation in FIG. 1, or D1, beneath which the panels are suspended in FIG. 4; and attachment devices such as hold-down clips E for tying the panels down on beams such as D of FIG. 1, or hangers E1 for suspending the panels as in FIG. 4.

Bottom A is preferably reinforced by stiffening ribs 12, two being embodied in the panel shown, and the remainder of the bottom consisting of three flat co-planar web sections, namely, a leftward side section 13, a central section 14, and a rightward side section 15 respecticely. Side sections 13 and 15 are joined by integral accordion folds 16 and 17 respectively to the respective side flanges B and C.

Flanges B and C embody respective skirt portions 18 and 19, which are formed as extensions of folds 16 at the respective sides of the channel; flat vertical web sections 20 and 21, joined to skirt portions 18 and 19 respectively by offset shoulders 22, and flat vertical web sections 23 and 24 integrally joined to the male and female beads 10 and 11 respectively. Flat vertical web sections 20, 21 are joined respectively to flat vertical web sections 23, 24 by respectively male and female locking beads 25 and 26, adapted to nest one within the other when the web sections 20 and 23 are in face-to-face contact with web sections 21 and 24.

Bead 10 is a tubular cylindrical roll comprising approximately a 90° back sector 27 joined integrally to vertical web section 23 by a bend 28, a diametrically opposed front sector 29 which is likewise of approximately 90° arcuate extent or somewhat more, and a reentrant moisture-trap trough portion 30 bridging between sectors 27 and 29. Bead 10 is open in a gap 31 defined between bend 28 and a lip which constitutes the terminal margin of sector 29. The gap 31 permits the lip to move toward bend 28, the sector 29 contracting inwardly as indicated by arrow in FIG. 2, in order to facilitate entry of male bead 10 into female bead 11 in a coupling operation which is illustrated in FIG. 2. Trough portion 30 is spaced from the inner wall of female bead 11 in the coupled condition (FIG. 1) to define a moisture trap which breaks the capillary passage defined between the mating walls of beads 10, 11, thus preventing capillary creeping of moisture into the interior of bead 10 (from which it could flow downwardly between adjoining flanges B and C so as to render ineffective the moisture-tight joint which the invention provides between the coupled panels).

Female bead 11 consists of a cylindrical tubular roll of somewhat more than 270° arcuate extent, joined to vertical web portion 24 by a bend 32 and terminating in an outwardly flared lip 33 which diverges from web portion 24 to define a flaring mouth 34 adapted to receive the sector 29 of male bead 10, and to open up in response to pressure as indicated in FIG. 2, sufficiently to receive the male bead 10 bodily within the bead 11. Mouth 34 opens into the interior of bead 11 through a longitudinal slot defined between the circumferential extremities of the cylindrical body thereof.

All of the channels parts described above, including beads 10 and 11, webs 21–24, gap 31 and mouth 34, locking beads 25, 26, skirts 18, 19, accordion folds 16, 17, and bottom parts 12–15, extend longitudinally in parallelism in the channel, which is a rolled section of resilient sheet metal such as medium hard aluminum alloy.

Hold-down clip E comprises a flat jaw 35 which is receivable in the space between skirts 18 and 19 and adapted to establish gripping engagement with one of them (e.g. skirt 18 as shown); a jaw 36 of Z configuration, adapted to mate with a panel fold 16, a bolt 37 for drawing jaws 35, 36 together with fold 16 clamped between them; a yoke 38 formed as an integral extension of jaw 36 and having notches 39 to receive beam D, and a set screw 40 such as shown in FIG. 4, for clamping the yoke 38 to beam D. Webs 13 of the panel bottom may rest on beam D as shown in FIGS. 5 and 6, or may be elevated above the beam as in FIGS. 1, 1A.

An important aspect of the invention is in mounting the panels spaced above the mounting beam D by a spacing in the range of about ¼″ to ½″, whereby, if the panel should be heavily loaded or walked upon, it will yield downwardly into resting engagement with beam D without being dented as could happen if it were stepped on when already in contact with the beam. In such a case, the pressing of the panel against the edge of the beam could create a dent in the panel. Also, electrolytic corrosion is avoided by supporting the panels out of contact with the beam.

FIG. 4 illustrates how the panels can be suspended from a beam D1 instead of resting on top of it, by using hangers E1. Such a hanger may include a yoke 38A having notches 39 to receive beam D1 for clamping yoke 38A to beam D1, a hanger arm 41 depending from one side of yoke 38A, an integral jaw 42 on the lower end of arm 41, and a jaw 43 attachable to arm 41 by a clamp screw 44. Jaws 42 and 43 are shaped to embrace and securely grip the female bead 11 of a joint between channels.

FIG. 5 illustrates another alternative hold-down clip E2, of pressed thin sheet metal having a foot 46 adapted to be secured to a support beam D by a bolt 47 or rivet, a body 48 adapted to extend upwardly between skirts 18, 19, a loop 49 contoured to fit between locking beads 25, 26, and, at its upper end a ring 50 adapted to fit between beads 10 and 11.

FIG. 6 illustrates a hold-down clip E3 which is a modification of clip E2, being the same in all respects except that is has on the front edge of foot 46 an integral tab 51 which is adapted to be bent around the forward margin of beam D and thence beneath the beam to provide a coupled connection thereto. Hold-down clips E2 and E3 of FIGS. 5 and 6 can be proportioned to hold the panels in contact with beam D as shown, or spaced above beam D as is FIG. 1.

For resisting heavy uplift loads, the arrangement shown in FIG. 1 can be modified by adding a second hold-down clamp 36, on the opposite side of clip E from the one shown, and clamped against the bead 16 on that side.

FIG. 7 discloses a supplemental clip F which can be used between beams D for clamping bends 16 against spreading which would tend to occur in response to heavy downward loading of the coupled panels between beams. Clip F may be sectional (of extruded metal) comprising a section 51 with female jaw channel 52, and a complementary section 53 with a male bead 54 adapted to be inserted in jaw channel 52 by relative longitudinal movement.

In constructing a ceiling or roof in accordance with this invention, a suitable support frame (e.g., composed of beams D) is first erected. Using one method of assembly, panels A, B, C are then attached to the frame beams, one at a time, beginning at one side of the frame, the first panel being positioned with its flange C adjacent that side and its flange B facing toward the opposite side of the frame, for coupling to the female coupling bead 11 of the next panel. After securing the first panel to the frame, the second panel is then laid alongside the first panel with its coupling bead 11 hooked over the male bead 10 of the first bead as in FIG. 2. Pressure is then applied to this bead 11 (e.g. by the workman's foot stepping down on the bead) causing the lip 33 of bead 11 to slide downwardly into trough 30 of bead 10 and then over the widest portion of bead 10 as in FIG. 3, until the bead 10 is completely received within bead 11. In this operation, the mouth 34 of bead 11 will be opened by spreading of the bead with a resilient flexing as indicated by arrow in FIG. 2, and bead 10 will be contracted by inward resilient flexing of its sector 29 as indicated by arrow. The initial entry of bead 10 into bead 11 is facilitated by the presence of trough 30 which modifies the cross-section of bead 10.

As bead 11 slides downwardly over bead 10 the new panel will first move in a vertical direction as indicated by the arrows of FIG. 2. In the final stage of descent (FIG. 3) the downwardly moving panel will shift laterally while still moving downwardly, as indicated by the inclined arrows of FIG. 3, the beads 25 and 10 popping into the beads 26 and 11 respectively. When locking bead 26 receives bead 25, flange C will move into mating engagement with flange B of the previously attached panel. The newly positioned panel is then secured to the frame D by one of the attachment devices E, E1, etc., and thus the beads 25, 26 are locked together so that they cannot become uncoupled. Correspondingly, the coupled flanges B and C are locked together by the locking action of beads 25, 26, so that they cannot become uncoupled. The coupled beads 25, 26 also function, in cooperation with coupling beads 10, 11, to rigidify and brace the coupled flanges B, C for high load-bearing operation in a roof or ceiling.

As an alternative method of installation, a series of panels can be assembled together upon a platform or frame or on simply a pair of spaced timbers, and subsequently raised onto the mounting frame by elevating such platform, frame or timbers; then clamped onto the mounting frame.

In a ceiling or roof structure composed of a plurality of panels A, B, C in side-by-side coupled relation, the entire structure is rigidified and braced by the abutting engagement of coupled flanges B, C. The accordion folds 16, 17 provide for some lateral yieldability of flanges B, C whereby it is possible to compress or stretch the panels to slightly reduced or increased width, to adjust to tolerance variations in the overall dimensions of a ceiling or roof structure. Of equal importance, the folds 16, 17 function as expansion joints, permitting the panel bottoms to expand and contract in response to increase and decrease in temperature, without buckling and without pulling the coupled flanges apart. Hence the flanges will remain at all times in locked, abutting engagement.

The mounting clips E and E1 can be either stamped steel or extruded aluminum, cut off in sections of appropriate width for the clips. Clips E2 and E3 are preferably of stainless steel.

An important advantage of the invention arises from the coupling and locking of adjoining panel flanges solely by the mating of the coupling and locking beads, and the attachment of the panels to a supporting frame by blind clips secured to the panels by clamping action, devoid of any perforations for fastener elements or other penetration of the panels. A completely watertight, non-leaking roof or ceiling is thus provided.

The invention also makes it possible to construct large panel assemblies on the ground, in a convenient location adjacent the building into which such assemblies are to be installed, thus facilitating assembly of the panels to one another. The assembled roof or ceiling can then be elevated and moved over onto the frame on which it is to be installed.

The invention also facilitates repair of a roof or ceiling by removal of a damaged panel without damage to adjoining panels, and the insertion of a replacement panel.

The roll machinery required for forming the panel units from sheet or coil stock can be mounted on a mobile truck along with suitable power units for driving the machinery, thus making it possible to fabricate the panelling at the construction site.

I claim:

1. An assembly of structural panels, each panel of resilient sheet metal and of open channel section comprising a bottom and respective side flanges generally at right angles to said bottom;
   one of said flanges having along its margin a male coupling bead;
   the other flange having along its margin a female coupling bead having a longitudinal mouth slot facing toward said bottom and adapted to receive the male bead of an adjoining panel in mating coupled relation;
   said flanges including respective web portions formed with respective locking beads of channel form disposed intermediate said coupling beads and said bottom and projecting substantially at right angles from said web portions and from said female bead mouth slot, said locking beads being adapted for mating coupling one with the other when said beads are coupled and said web portions are in abutting relation;
   means for anchoring at least one side of each panel to a horizontal support member with the bottoms thereof disposed in a common horizontal plane, whereby said locking beads are retained in interlocking relation preventing any relative shifting of said flanges in the planes of their web portions and consequently said coupling beads are secured in coupled relation and the interlocked flanges are connected and braced for load-bearing functioning;
   said mouth slot facing toward said bottom on the opposite side of said other flange from its respective locking bead, whereby said coupling beads and locking beads can be simultaneously coupled by shifting said other flange of one panel diagonally toward said one flange of an adjacent panel and toward the plane of the bottom thereof; and
   longitudinally extending accordion folds joining said flanges to the respective sides of said bottom;
   said anchoring means comprising, in combination with a coupled pair of said flanges, a connecting clip engaging adjacent accordion folds with a clamping action to inhibit spreading of a joint between said coupled pair in response to downward loading thereof.

2. A structural panel of resilient sheet metal and of channel section comprising a bottom and respective side flanges:
   one of said flanges having along its margin a male coupling bead;
   the other flange having along its margin a female coupling bead having a longitudinal mouth slot and adapted to receive the male bead of an adjoining panel in mating coupled relation;
   said flanges including respective web portions formed with respective locking beads of channel form adapted for mating coupling one with the other when said beads are coupling and said web portions are in abutting relation;
   longitudinally extending accordion folds joining said flanges to the respective sides of said bottom;
   said flanges including skirts adjoining said folds, said skirts being offset outwardly from the plane of abutment of the web portions;
   and means for anchoring at least one side of each panel to a horizontal support member, said anchoring means comprising a hold-down clip having a part adapted to project upwardly between said skirts, for attachment to the coupled flanges, said clip having jaws for clamping engagement with one of said accordion folds formed as an extension of one of said skirts.

3. A structural panel of resilient sheet metal and of channel section comprising a bottom and respective side flanges;
   one of said flanges having along its margin a male coupling bead;
   the other flange having along its margin a female coupling bead having a longitudinal mouth slot and adapted to receive the male bead of an adjoining panel in mating coupled relation;
   said flanges including respective web portions formed with respective locking beads of channel form adapted for mating coupling one with the other when said beads are coupling and said web portions are in abutting relation;
   longitudinally extending accordion folds joining said flanges to the respective sides of said bottom;
   said flanges including skirts adjoining said folds, said skirts being offset outwardly from the plane of abutment of the web portions;

and means for anchoring at least one side of each panel to a horizontal support member, said anchoring means comprising a hold-down clip having a part adapted to project upwardly between said skirt, for attachment to the coupled flanges, said clip being of thin sheet metal and including a looped portion adapted to be received between the coupled locking beads in mating relation therewith.

References Cited

UNITED STATES PATENTS

| | | | |
|---|---|---|---|
| 3,160,974 | 12/1964 | Carleton | 287—189.36 |
| 3,312,028 | 4/1967 | Schroyer | 52—478 |
| 1,329,794 | 2/1920 | Moomaw | 52—531 |
| 2,302,949 | 11/1942 | Palmer | 52—530 |

FOREIGN PATENTS

| | | |
|---|---|---|
| 581,464 | 8/1958 | Italy. |
| 482,256 | 4/1952 | Canada. |

EDWARD C. ALLEN, Primary Examiner

U.S. Cl. X.R.

52—483, 588